United States Patent
McMinn et al.

(10) Patent No.: US 7,069,411 B1
(45) Date of Patent: Jun. 27, 2006

(54) MAPPER CIRCUIT WITH BACKUP CAPABILITY

(75) Inventors: Brian D. McMinn, Buda, TX (US); Mitchell Alsup, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 336 days.

(21) Appl. No.: 10/633,899

(22) Filed: Aug. 4, 2003

(51) Int. Cl.
*G06F 12/02* (2006.01)

(52) U.S. Cl. .................................. 711/202
(58) Field of Classification Search ........... 711/108, 711/202; 712/217, 228
See application file for complete search history.

(56) References Cited

U.S. PATENT DOCUMENTS

| | | | |
|---|---|---|---|
| 5,197,132 A * | 3/1993 | Steely et al. ............. | 712/217 |
| 5,355,457 A | 10/1994 | Shebanow et al. | |
| 5,694,564 A | 12/1997 | Alsup et al. | |
| 6,119,223 A | 9/2000 | Witt | |
| 6,421,758 B1 * | 7/2002 | Buti ........................ | 711/108 |
| 6,633,970 B1 * | 10/2003 | Clift et al. ................ | 712/217 |
| 2002/0144091 A1 * | 10/2002 | Widigen ................... | 712/217 |
| 2004/0177239 A1 * | 9/2004 | Clift et al. ................ | 712/228 |
| 2004/0230778 A1 * | 11/2004 | Chou et al. ............... | 712/228 |
| 2005/0038980 A1 * | 2/2005 | Rodgers et al. ........... | 712/220 |

* cited by examiner

*Primary Examiner*—Kevin L. Ellis
(74) *Attorney, Agent, or Firm*—Lawrence J. Merkel; Meyertons, Hood, Kivlin, Kowert & Goetzel, P.C.; Erik A. Heter (57) ABSTRACT

A mapper circuit with backup capability. In one embodiment, the mapper circuit may store associations between physical register names (PRNs) and logical register names (LRNs) in a plurality of storage locations, each of the storage locations corresponding to a speculative state. One of the storage locations may store a LRN-to-PRN mappings for a current speculative state, while the other storage locations may store LRN-to-PRN mappings for previous speculative states. In a case where the processor is required to back up (e.g., such as in the case of a branch misprediction), one of the mappings associated with a previous speculative state may be reverted to an association with the current speculative state.

19 Claims, 8 Drawing Sheets

MAPPER CIRCUIT WITH BACKUP CAPABILITY

BACKGROUND OF THE INVENTION

1. Field of the Invention

This invention is related to the field of microprocessors, and more particularly, the mapping of physical register names to logical register name via a mapper circuit.

2. Description of the Related Art

High performance microprocessors use various techniques to speed up the execution of instructions, including the speculative/out-of-order execution of instructions. Since speculatively executed instructions may update the registers in a microprocessor, a means for storing speculative results that may be written to the logical (architected) registers may be implemented.

Register renaming is a technique used to keep track of speculative results that may be intended to be written to the logical registers. A microprocessor employing register renaming may include a physical register file which may store several copies of results intended for the logical registers. Each logical register may be associated with speculative results stored in a number of physical registers, as well as one non-speculative result stored in a physical register. This may allow several speculative results to be stored for each logical register, and may further allow for instructions to be executed out of order without concern for overwriting various results before they are no longer needed.

A mapper may provide associations between physical registers and logical registers. The mapper may provide associations for each logical register to a number of physical registers. These associations may include a non-speculative logical register state as well as several speculative logical register states. In general, the mapper may store a currently active logical-to-physical register association at a time T as well as several speculative logical-to-physical register associations for speculative results generated from a previous time U.

At times, some or all of the speculative register results generated between time T and time U may not be used. For example, speculative register results may include results generated from the prediction of a branch in a stream of instructions. If the branch is not taken, those results generated for instructions following the branch may not be used. In such cases, the mapper may be required to discard some or all of the speculative mappings made between time T and time U and reset itself to a state it was in at a previous point between time T and time U. In some cases, it may be necessary to back up the mapper to reflect a state resulting from retiring only a subset of operations of a particular instruction having multiple operations (i.e. a 'partial retire').

SUMMARY OF THE INVENTION

A mapper circuit with backup capability is disclosed. In one embodiment, the mapper circuit may store associations between physical register names (PRNs) and logical register names (LRNs) in a plurality of storage locations, each of the storage locations corresponding to a speculative state. One of the storage locations may store LRN-to-PRN mappings for a current speculative state, while the other storage locations may store LRN-to-PRN mappings for previous speculative states. In a case where the processor is required to back up (e.g., such as in the case of a branch misprediction), one of the mappings associated with a previous speculative state may be reverted to an association with the current speculative state.

In one embodiment, the mapper circuit may be implemented in a random access memory (RAM). The mapper circuit may include a plurality of addressable units each addressed by a different LRN. Each addressable unit may include a plurality of storage locations, wherein a first storage location may be configured to store a PRN currently assigned to its associated LRN. Additional storage locations may store PRNs previously assigned to the LRN. The mapper circuit may also include a control circuit coupled to the addressable units. The control circuit may be configured to, responsive to a new PRN being assigned to the LRN that addresses the addressable unit, copy the currently assigned PRN to another one of the storage locations. The new PRN may be written into the first storage location.

In another embodiment, the mapper circuit may be implemented in a content addressable memory (CAM). The CAM-based mapper circuit may include a plurality of memory locations each corresponding to a different PRN. Each of the memory locations may store an LRN and valid indications, each of which correspond to a checkpoint and is indicative of whether or not the PRN is assigned to the LRN at that checkpoint. A portion of the memory implemented as a CAM may store LRNs for comparison with a received LRN. If a received LRN matches a stored LRN and a corresponding valid indication indicates that the PRN assigned to the LRN at that checkpoint, the mapper circuit may output the PRN.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Processor Overview

Figure 1:
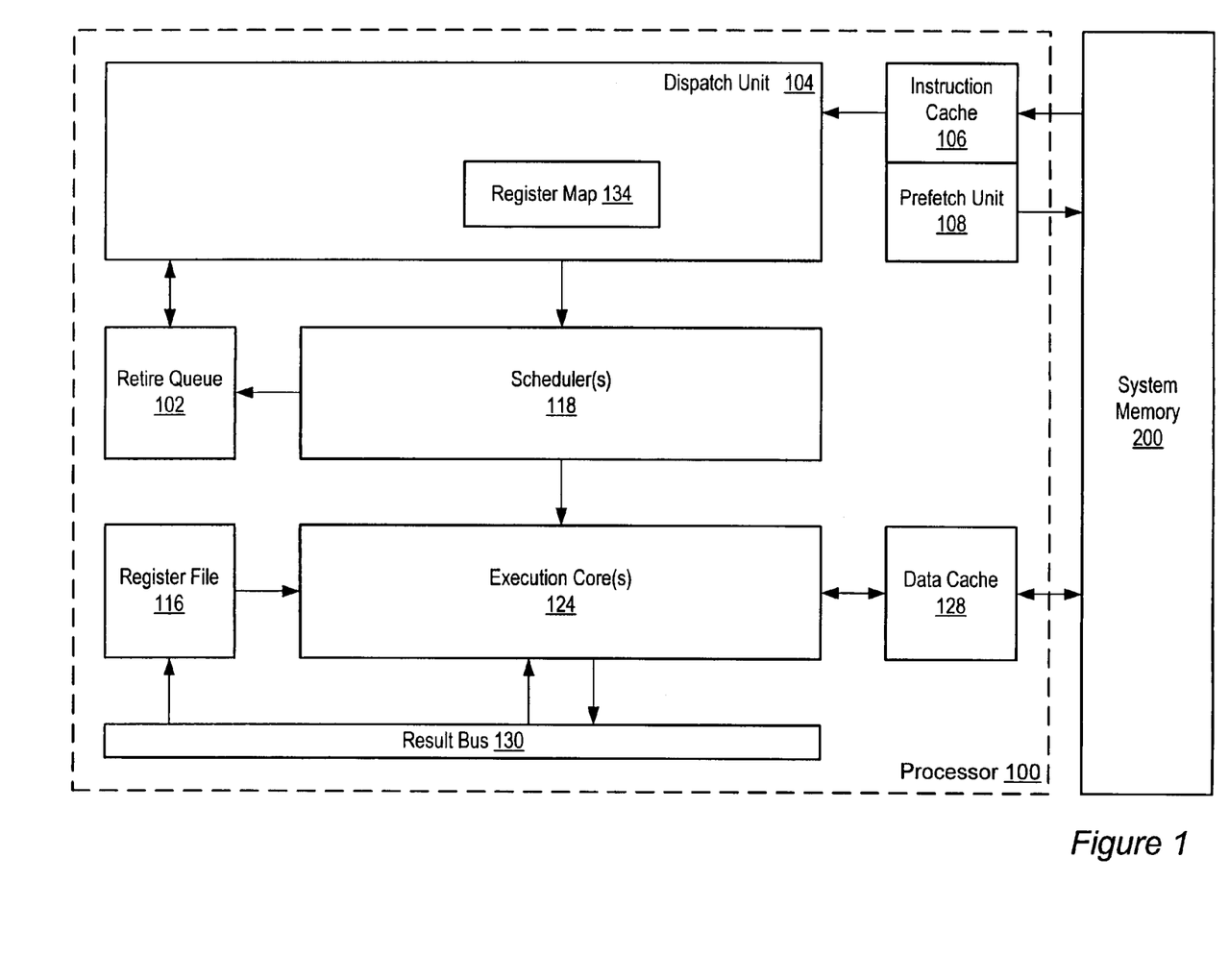
FIG. 1 is a block diagram of one embodiment of a microprocessor.

FIG. 1 is a block diagram of one embodiment of a processor 100. The processor 100 is configured to execute instructions stored in a system memory 200. Many of these instructions operate on data stored in the system memory 200. It is noted that the system memory 200 may be physically distributed throughout a computer system and/or may be accessed by one or more processors 100.

In the illustrated embodiment, the processor 100 may include an instruction cache 106 and a data cache 128. The processor 100 may include a prefetch unit 108 coupled to the instruction cache 106. A dispatch unit 104 may be configured to receive instructions from the instruction cache 106 and to dispatch operations to the scheduler(s) 118. One or more of the schedulers 118 may be coupled to receive dispatched operations from the dispatch unit 104 and to issue operations to the one or more execution cores 34. The execution core(s) 124 may include one or more integer units, one or more floating point units, and one or more load/store units. Results generated by the execution core(s) 124 may be output to one or more result buses 130 (a single result bus is shown here for clarity, although multiple result buses are possible and contemplated). These results may be used as operand values for subsequently issued instructions and/or stored to the register file 116. A retire queue 102 may be coupled to the scheduler(s) 118 and the dispatch unit 104. The retire queue 102 may be configured to determine when each issued operation may be retired. In one embodiment, the processor 100 may be designed to be compatible with the x86 architecture (also known as the Intel Architecture-32, or IA-32). Note that the processor 100 may also include many other components. For example, the processor 100 may include a branch prediction unit (not shown).

The instruction cache 106 may store instructions for fetch by the dispatch unit 104. Instruction code may be provided to the instruction cache 106 for storage by prefetching code from the system memory 200 through the prefetch unit 108. Instruction cache 106 may be implemented in various configurations (e.g., set-associative, fully-associative, or direct-mapped).

The prefetch unit 108 may prefetch instruction code from the system memory 200 for storage within the instruction cache 106. The prefetch unit 108 may employ a variety of specific code prefetching techniques and algorithms.

The dispatch unit 104 may output operations executable by the execution core(s) 124 as well as operand address information, immediate data and/or displacement data. In some embodiments, the dispatch unit 104 may include decoding circuitry (not shown) for decoding certain instructions into operations executable within the execution core(s) 124. Simple instructions may correspond to a single operation. In some embodiments, more complex instructions may correspond to multiple operations. Upon decode of an operation that involves the update of a register, a register location within register file 116 may be reserved to store speculative register states (in an alternative embodiment, a reorder buffer may be used to store one or more speculative register states for each register and the register file 116 may store a committed register state for each register). A register map 134 may translate logical register names of source and destination operands to physical register numbers in order to facilitate register renaming. The register map 134 may track which registers within the register file 116 are currently allocated and unallocated.

The processor 100 of FIG. 1 may support out of order execution. The retire queue 102 may keep track of the original program sequence for register read and write operations, allow for speculative instruction execution and branch misprediction recovery, and facilitate precise exceptions. In some embodiments, the retire queue 102 may also support register renaming by providing data value storage for speculative register states (e.g. similar to a reorder buffer). In other embodiments, the retire queue 102 may function similarly to a reorder buffer but may not provide any data value storage. As operations are retired, the retire queue 102 may deallocate registers in the register file 116 that are no longer needed to store speculative register states and provide signals to the register map 134 indicating which registers are currently free. By maintaining speculative register states within the register file 116 (or, in alternative embodiments, within a reorder buffer) until the operations that generated those states are validated, the results of speculatively-executed operations along a mispredicted path may be invalidated in the register file 116 if a branch prediction is incorrect.

In one embodiment, a given register of register file 116 may be configured to store a data result of an executed instruction and may also store one or more flag bits that may be updated by the executed instruction. Flag bits may convey various types of information that may be important in executing subsequent instructions (e.g. indicating a carry or overflow situation exists as a result of an addition or multiplication operation. Architecturally, a flags register may be defined that stores the flags. Thus, a write to the given register may update both a logical register and the flags register. It should be noted that not all instructions may update the one or more flags.

The register map 134 may assign a physical register to a particular logical register (e.g. architected register or microarchitecturally specified registers) specified as a destination operand for an operation. The dispatch unit 104 may determine that the register file 116 has a previously allocated physical register assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in the register file 116) through a load/store unit (not shown). Operand data values may be provided to the execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

As used herein, a scheduler is a device that detects when operations are ready for execution and issues ready operations to one or more execution units. For example, a reservation station may be one type of scheduler. Independent reservation stations per execution core may be provided, or a central reservation station from which operations are issued may be provided. In other embodiments, a central scheduler which retains the operations until retirement may be used. Each scheduler 118 may be capable of holding operation information (e.g., the operation as well as operand values, operand tags, and/or immediate data) for several pending operations awaiting issue to an execution core 34. In some embodiments, each scheduler 118 may not provide operand value storage. Instead, each scheduler may monitor issued operations and results available in the register file 116 in order to determine when operand values will be available to be read by the execution core(s) 124 (from the register file 116 or the result bus 130).

Register Renaming Overview

Figure 2:
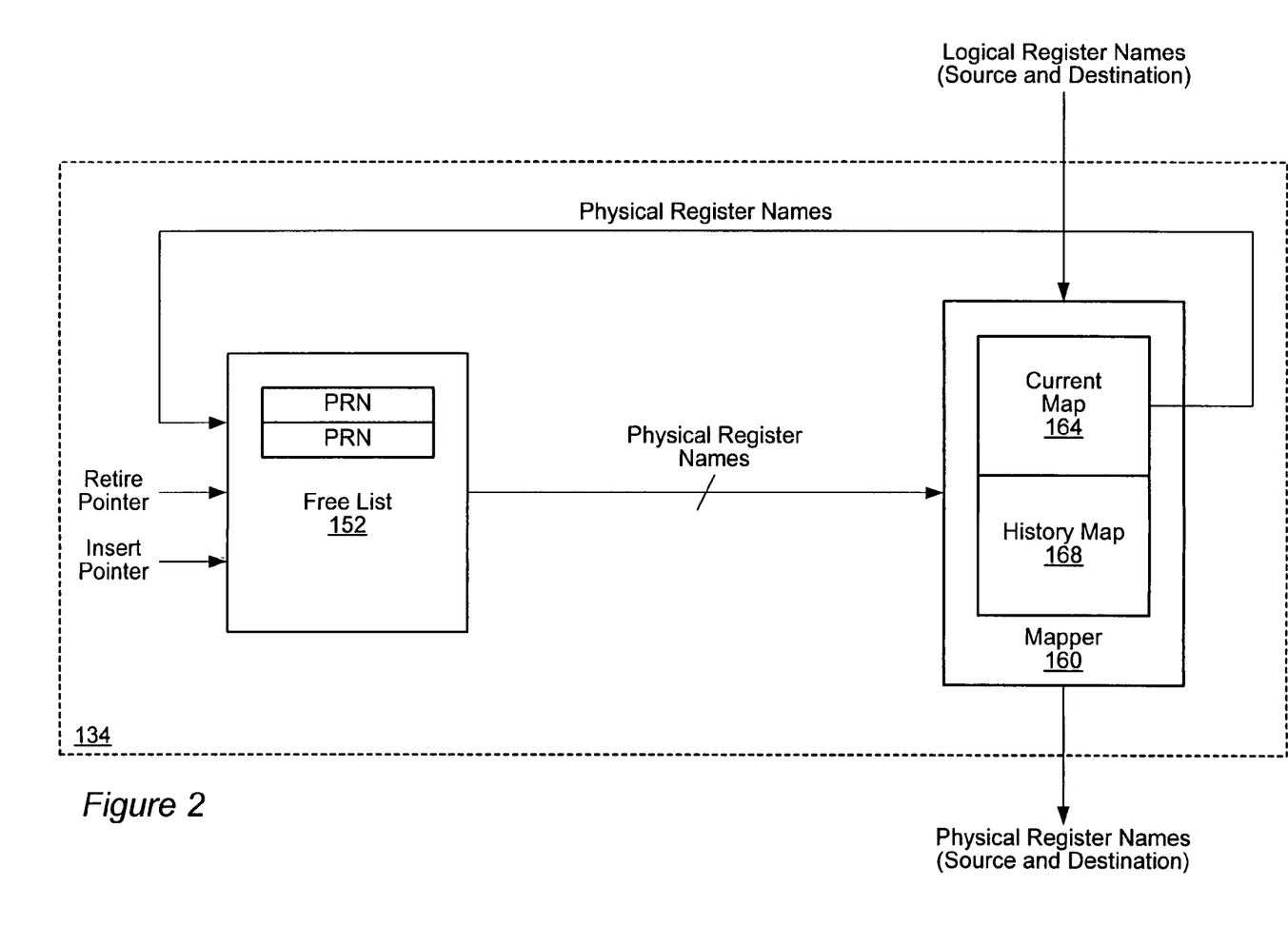
FIG. 2 is a block diagram of one embodiment of a register map.

Turning now to FIG. 2, a block diagram of one embodiment of a register map is shown. In the embodiment shown, register map 134 includes free list 152, and mapper 160. Similarly, mapper 160 may include a storage circuit that may store information corresponding to LRN-to-PRN associations for one or more checkpoints. Free list 152 include a storage circuit that may store physical register numbers (PRNs) that are not currently assigned to a logical register name, and may provide PRNs to mapper 160. Free list 152 may also be coupled to receive PRNs from mapper 160.

It should be noted that, as used herein, the term logical register refers to a register that is defined by the instruction set implemented by the processor. Logical registers may also include microarchitected registers such as register reserved for microcode use. A physical register, as used herein, refers to a register that is physically implemented in the register file of the processor.

Mapper 160 may be coupled to receive logical register names (LRNs). PRNs received from free list 152 may be assigned to each of the received LRNs that correspond to a destination of an operation, and the associations between each LRN and its assigned PRN may be stored in mapper 160. Mapper 160 may be configured to store associations between PRNs and LRNs for a plurality of speculative states, including a current speculative state and a number of previous speculative states. The LRNs provided to mapper 160 may either be a source register or a destination register, and mapper 160 may be configured to provide PRNs for both source and destination registers. The LRN-to-PRN mappings associated with the current speculative state may be stored in current map 164, while LRN-to-PRN mappings for previous speculative states may be stored in history map 168. In the event of the processor needs to back up (e.g., due to a branch misprediction or exception), one of the LRN-to-PRN mappings associated with a previous speculative state may be written into current map 164 from the history map 168.

In some embodiments, mapper 160 may receive logical register names for a sequence of instructions or operations. Such a sequence may be referred to as a trace. Results generated for operations executed within a trace may be either slot results or logical register results. Slot results are those results that may be generated during the execution of the sequence of operations but may be subsequently overwritten by another operation within the same sequence. In other words, any data value generated that is a slot result may die before the sequence completes execution. On the other hand, a logical register result is a result that does not die at the end of the sequence, and may potentially be committed to an associated logical register (i.e. retired when the trace is). Physical register numbers provided to current map 164 and assigned to slot results may be immediately returned to free list 152. Also, PRNs that are not used may also be immediately returned, as well as PRNs that are displaced from the current map by newly received PRNs from free list 152. However, if a PRN corresponds to a logical register result, it may be stored in current map 164 until the corresponding logical register is used as a destination register of a subsequent operation. It should be noted that even when a PRN is removed from current map 164 due to its associated logical register being used as a destination register, the PRN may still be stored in the history map.

Mapper 160 may periodically create checkpoints. A checkpoint may include a set of LRN-to-PRN mappings that correspond to a particular point in the speculative stream of operations. A checkpoint may restore the current map 164 in the event that processor 100 needs to back up (i.e. a backup situation). Checkpoints may be created in various intervals. In one embodiment, a single checkpoint may be created for each trace issued, although other embodiments are possible and contemplated wherein multiple checkpoints are created per trace as well as embodiments where a checkpoint is created for each operation. Each of the speculative states in the history map 168 may correspond to a checkpoint. It should also noted that, for a given embodiment, checkpoints may be created for more than one of the various scenarios described above. Embodiments are also possible and contemplated where multiple checkpoints may be created for a given trace and embodiments wherein multiple traces are associated with a single checkpoint.

Mapper 160 may be a RAM (random access memory) based mapper in some embodiments, or may be a CAM (content addressable memory) in other embodiments. Various embodiments of both RAM and CAM-based mappers will be discussed in further detail below. It should be noted that, although shown in FIG. 2 as separate memories, current map 164 and history map 168 may in fact be combined in a single structure. The illustration of FIG. 2 is not meant to imply that current map 164 and history map 168 are separate memories, either physically or architecturally. Furthermore, various representations of the information stored in mapper 160 may be used, as will be illustrated in further detail below.

Restoring the Mapper State on Backup/Partial Retire

Figure 3:
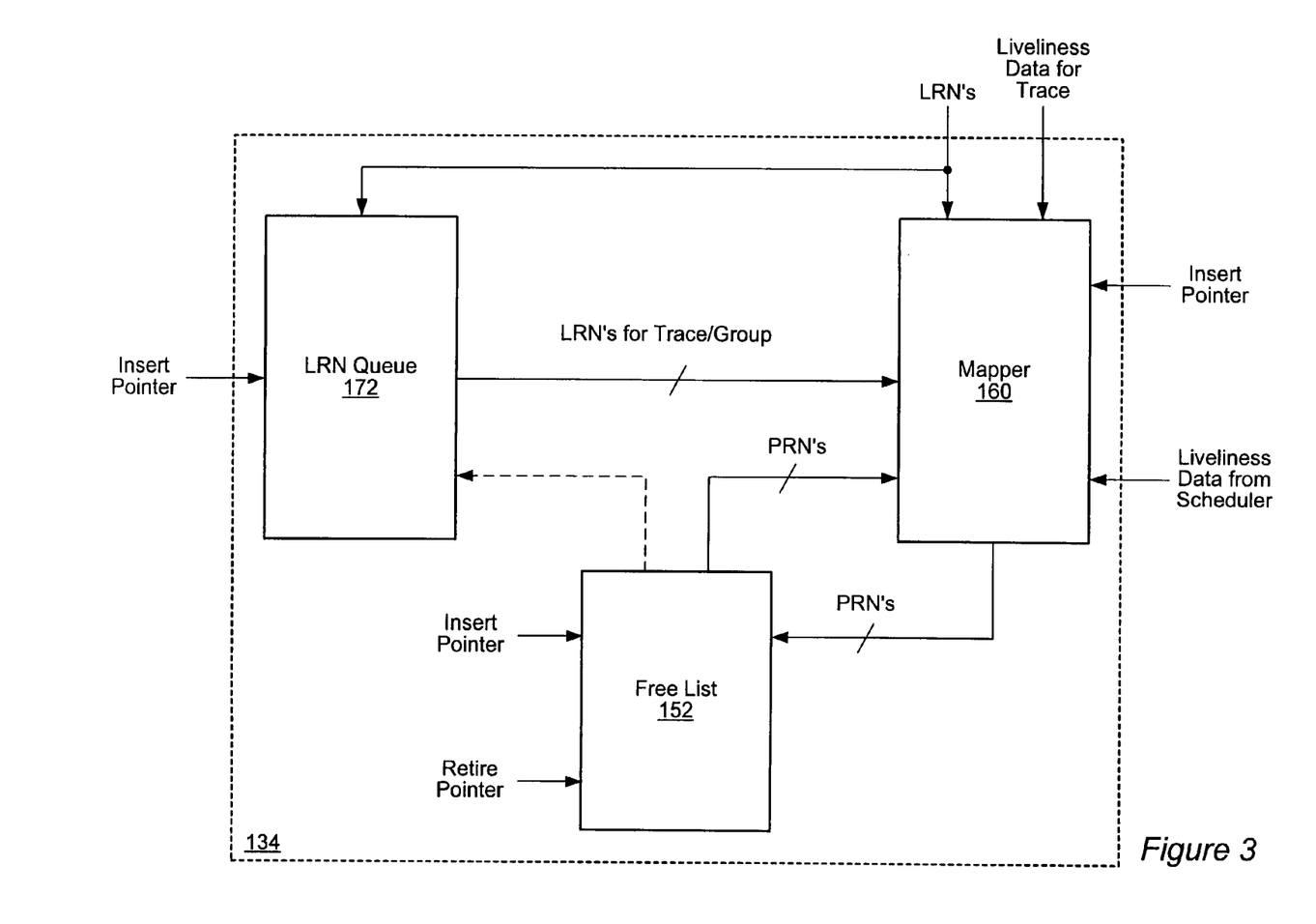
FIG. 3 is a block diagram of an embodiment of a register map including a logical register name (LRN) queue.

Moving now to FIG. 3, a block diagram of an embodiment of a register map including a LRN queue 172 is shown. Free list 152 may be similar to the free list described above in reference to FIG. 2. Similarly, mapper 160 may be a mapper similar to that described above in reference to FIG. 2, as well as one of the various embodiments discussed below with regard to FIGS. 4, 5A and 5B.

As mentioned above, the current map 164 may be restored to a checkpoint state from the history map 168 (e.g., as detailed below in regard to FIGS. 4, 5A, and 5B). Additionally, in the case of a branch misprediction, the operations that were previously dispatched subsequent to the checkpoint and which are prior to the mispredicted branch are still to be executed, and thus their mappings need to be placed back into the current map 164 after restoring the checkpoint. To reconstruct these mappings in some embodiments, the LRNs of these operations may be needed. The LRN queue 172 may supply the LRNs to reconstruct the mappings. Similarly, in the case of a partial retire, the LRNs of operations prior to the operation having the exception (and subsequent to the restored checkpoint) may be supplied by the LRN queue 172. In one embodiment, the set of PRNs provided for the original mapping may be supplied by the free list 152. In other embodiments, the LRN queue 172 may stored the PRNs as well and provide them for reconstructing the mappings.

In one embodiment, free list 152 may be a circular buffer. In the embodiment shown, free list 152 is coupled to receive both a retire pointer and an insert pointer. The insert pointer may point to a location in the free list where PRNs are to be outputted from (and thus provided to mapper 160) and to which PRNs returned to free list 152 from mapper 160 are to be written. The insert pointer may not return to that entry until operations corresponding to those PRNs have been retired (as may be indicated by the retire pointer passing that entry). Therefore, by the time those same PRNs are selected again, register results corresponding to a new mapping (that occurred between the time the physical register were written into the free list and the time that the insert pointer returns to them) may have been committed and thus those physical registers may be guaranteed to be free (and may also guarantee that enough PRNs are available to handle all the possible destinations for a given trace).

The retire pointer may indicate a point at which results are no longer speculative. Those PRNs which have been written into an entry of free list 152 may or may not be free prior to the passing of the retire pointer over their respective entry. If a backup situation occurs (as will be discussed in further detail below), PRNs in an entry that has not been passed by the retire pointer subsequent to writing them into free list 152 may be reassigned to an LRN via restoring a mapping associated with the checkpoint being backed up to. Thus, as a result of the backup situation, the affected PRNs may no longer be free.

The insert pointer may also be received by mapper 160 and may provide information corresponding with the current speculative state stored in the current map (e.g., may point to a location in the mapper where the current state is stored, for one embodiment). LRN queue 172, which may also be a circular buffer structure in one embodiment, may also be coupled to receive the insert pointer, which may point to a location where LRNs are to be stored (if a backup situation is not occurring) or outputted in order to be provided to mapper 160 (if a backup situation is occurring). In one embodiment, both the insert pointer and retire pointer may be provided by a scheduler 118.

In the embodiment shown, both mapper 160 and LRN queue 172 may receive LRNs associated with operations being dispatched. These LRNs may correspond to registers that may be used as source and/or destination registers for operations that are dispatched to a scheduler (e.g., scheduler 118 discussed above). LRNs received by LRN queue 172 may be stored and provided to mapper 160 in the event of a backup situation (including those that involve a partial retire), as will be explained below. In addition to receiving LRNs, mapper 160 may also receive liveness data. The liveness data may be used, for example, to indicate which operations of a trace are expected to be executed. In addition to backing up with new liveness data as a result of a branch misprediction, a subsequent trace following the trace having the branch misprediction may also be fetched. The subsequent trace may be fetched based on the correct path of the branch that was earlier mispredicted.

As noted above, operations or instructions may be issued in traces in some processor embodiments. Each trace may include a group of operations/instructions that are to be executed. These operations may include branches. A branch may be broadly defined as a conditional or unconditional change in a sequence of executed operations/instructions. A branch taken within a trace may cause instructions following the branch within the trace to not be executed, while other operations following the branch within the trace may be executed. Conversely, a branch not taken may result in the execution of operations following the branch. Liveness data received by mapper 160 may indicate whether or not a branch is expected to be taken for a trace (or any sequence of operations) having a branch. If a branch is mispredicted (which results in a backup situation) the operations to be executed within the trace change and thus the liveness data for some operations changes as well. It should be noted that a trace may have more than one branch within it.

An exception may also result in the need for a backup and a change in liveness data for some operations. In the case of a trace or other group of operations, the liveness data of those operations subsequent to that operation which was associated with the exception may change as a result of the exception. An exception may occur when, for various reasons, the processor is not able to complete execution of an operation. A backup situation occurring due to an exception may also result in a partial retire, wherein operations performed previous to the operation where the exception occurred may be retired but the operations subsequent to the operation where the exception occurred are not retired. In general, backing up and partial retired are related to each other, as each are both triggered by either a branch misprediction or an exception. Embodiments having other causes (e.g., a speculatively obtained external synchronization mechanism) which may trigger a backup are possible and contemplated.

Register map 134 may support both backup operations resulting from an exception and backups resulting from branch mispredictions. During a backup operation, LRN queue 172 may provide LRNs to mapper 160. LRN queue 172 may include a plurality of entries, wherein each of the entries is associated with a checkpoint. An entry in LRN queue 172 may include a full list of LRNs associated with a trace.

Performing a backup may include restoring the current map in mapper 160 to the checkpoint having the speculative state just prior to the trace having the backup situation. Restoring a checkpoint as a result of a backup situation will be discussed in further detail below in reference to the CAM and RAM-based mappers. In one embodiment, performing a backup may further require that mapper 160 construct a corrected mapping and receive new liveness data corresponding to that checkpoint. LRN queue 172 may provide LRNs associated with the checkpoint, while free list 152 may provide the PRNs that were provided in the original mapping operation. During a backup situation, the insert pointer may be moved back to the entries corresponding to the checkpoint being backed up to and thus may point to the location corresponding to the misprediction/exception and the appropriate LRNs/PRNs may be retrieved. Mapper 160 may receive the LRNs and PRNs from their respective sources and may construct the corrected mappings of LRNs to PRNs for the particular checkpoint which is being backed up to. New liveness data may be provided to mapper 160 from a scheduler 118, and may indicate the liveness of instructions or operations within the concurrently dispatched group for which the backup is being performed.

In order to construct a mapping associated with a previous checkpoint when a backup occurs, the PRNs may be provided in the same order in which they were previously provided in order to construct the mapping in the first place. In one embodiment, the known-used PRNs may be stored in the LRN queue along with their associated LRNs, which may allow the PRNs to be assigned to the LRNs as they were when the mapping was previously constructed. In another embodiment, entries in the free list may include extra information which may allow the free list to provide the PRNs in the correct order along with the LRNs, which may thereby allow the mapping to be constructed in mapper 160.

Figure 4:
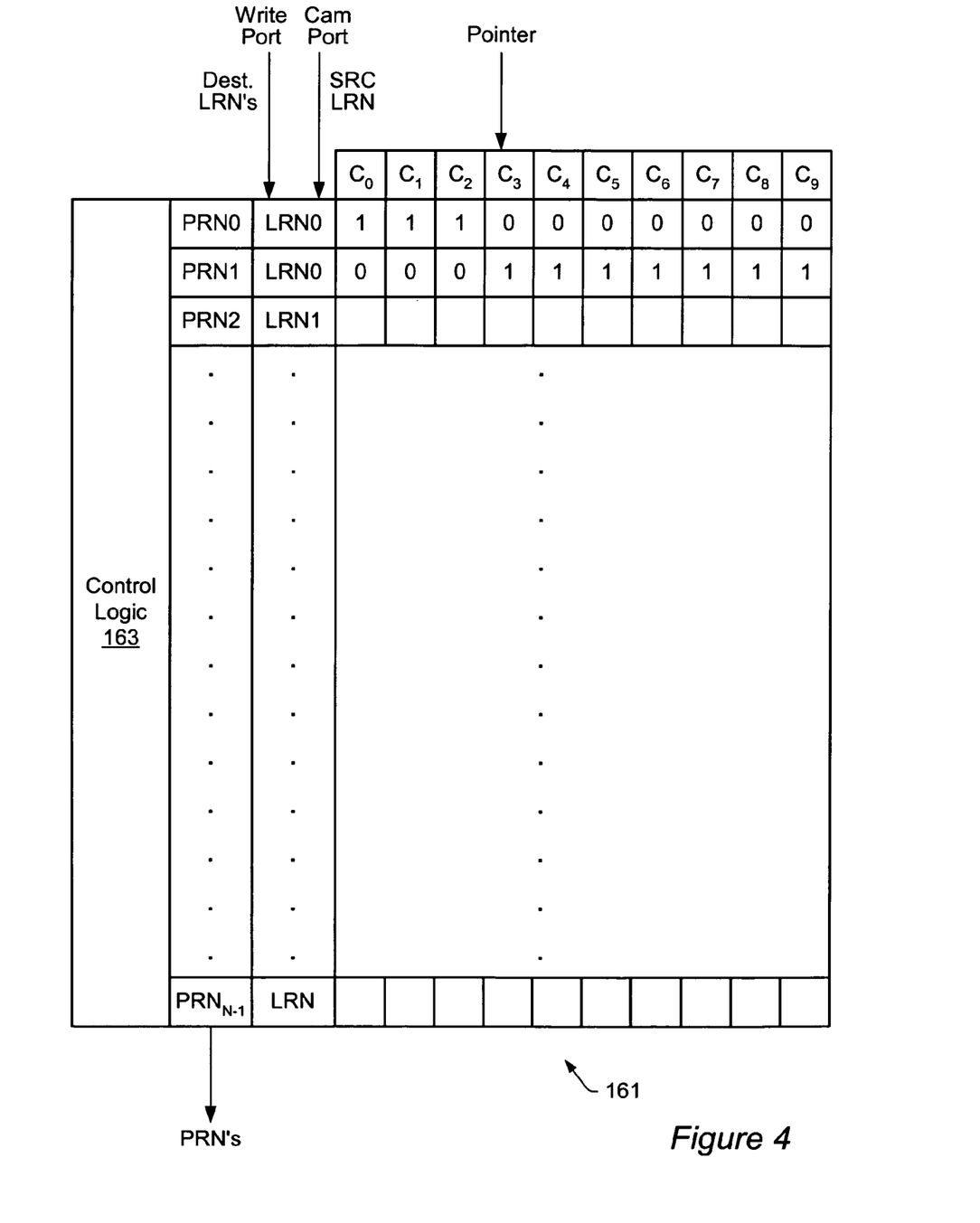
FIG. 4 is a block diagram of one embodiment of a mapper implemented with a content addressable memory (CAM)

Turning now to FIG. 4, a block diagram of one embodiment of a mapper implemented with a content addressable memory (CAM) is shown. In the embodiment shown, mapper 161 is a CAM-based mapper that may be indexed by PRNs. Each memory location in mapper 161 may be associated with a different PRN, and thus the number of memory locations in this embodiment of mapper 161 may be equal to the number of physical registers present in a register file of the processor, such as register file 116 of FIG. 1.

Each memory location may store an LRN and a plurality of valid bits each corresponding to a checkpoint. A valid bit, when set (shown as a logic 1 for this embodiment) may indicate that the PRN of the memory locations is assigned to the stored LRN for the corresponding checkpoint. For example, the valid bits for checkpoints $C_0$, $C_1$, and $C_2$ for memory location corresponding to $PRN_0$ (which is storing $LRN_0$ in this example) are set, indicating that $PRN_0$ is assigned to $LRN_0$ for each of the speculative states associated with these checkpoints. Similarly, valid bits are set for checkpoints $C_3$–$C_9$ in the memory location of $PRN_1$ (which is also storing $LRN_0$) indicating that $PRN_1$ is assigned to $LRN_0$ for those checkpoints. It should be noted that for any given checkpoint, only one PRN may be assigned to a given LRN.

In the embodiment shown, the current checkpoint (and thus the current speculative state) may be indicated by a pointer. The pointer may move to a new checkpoint each time a new group of instructions is dispatched. In the case of a backup situation, the pointer may be moved back to a previous checkpoint. Thus, in this embodiment, current map 164 and the history map 168 are merged into a single memory and the current map at any given time may be indicated by the pointer. It should be noted that other embodiments are possible and contemplated wherein no pointer is used and thus one of the checkpoints may be permanently designated at the current checkpoint, with its valid bits updated each time a LRN-to-PRN association changes.

When instructions are dispatched, the associations between PRNs and LRNs may be updated. LRNs may be written into a memory location through a write port. The destination LRNs may correspond to logical registers that are to be used as destination registers for storing a result of an executed instruction. A given LRN may be written into the storage location corresponding to a PRN assigned to that LRN by mapper 161.

When the pointer is moved to a new checkpoint, valid bits corresponding to that state may be set for each valid LRN-to-PRN association. For a given LRN, if it was assigned a new PRN in the current checkpoint, the valid bit for the new PRN may be set and the valid bit for the previous PRN assigned to that LRN may be cleared. For other PRNs, valid bits from the previous checkpoint may be copied into the current checkpoint.

If a logical register is to be used as a source for an instruction to be executed, the LRN corresponding to that logical register may be input into a CAM port. When the LRN is input into the CAM port, comparison logic may compare the LRN with the LRNs stored in the various memory locations of mapper 161. The search operation may in some cases yield more than one match since the associations for PRNs and LRNs may be different for different checkpoints. Once one or more matches are found from the comparison operation, the comparison logic may examine the corresponding valid bits for the current checkpoint. If the valid bit for a matching LRN is set for the current checkpoint, the corresponding PRN may be output by mapper 161, thereby indicating that the corresponding physical register is assigned to the logical register which is to be used as an operand source.

If a backup situation occurs (e.g., due to a branch misprediction, an exception, etc.), the pointer may be moved to point to a previous checkpoint (with the previous checkpoint becoming the current checkpoint). By moving the pointer to a previous checkpoint, the LRN-to-PRN associations for that checkpoint may be effectively restored. In the case where one of the checkpoints of mapper 161 is in a fixed location, the valid bits for the previous checkpoint being backed up to may be copied into the location of the current checkpoint in order to restore the previous LRN-to-PRN associations.

Figure 5A:
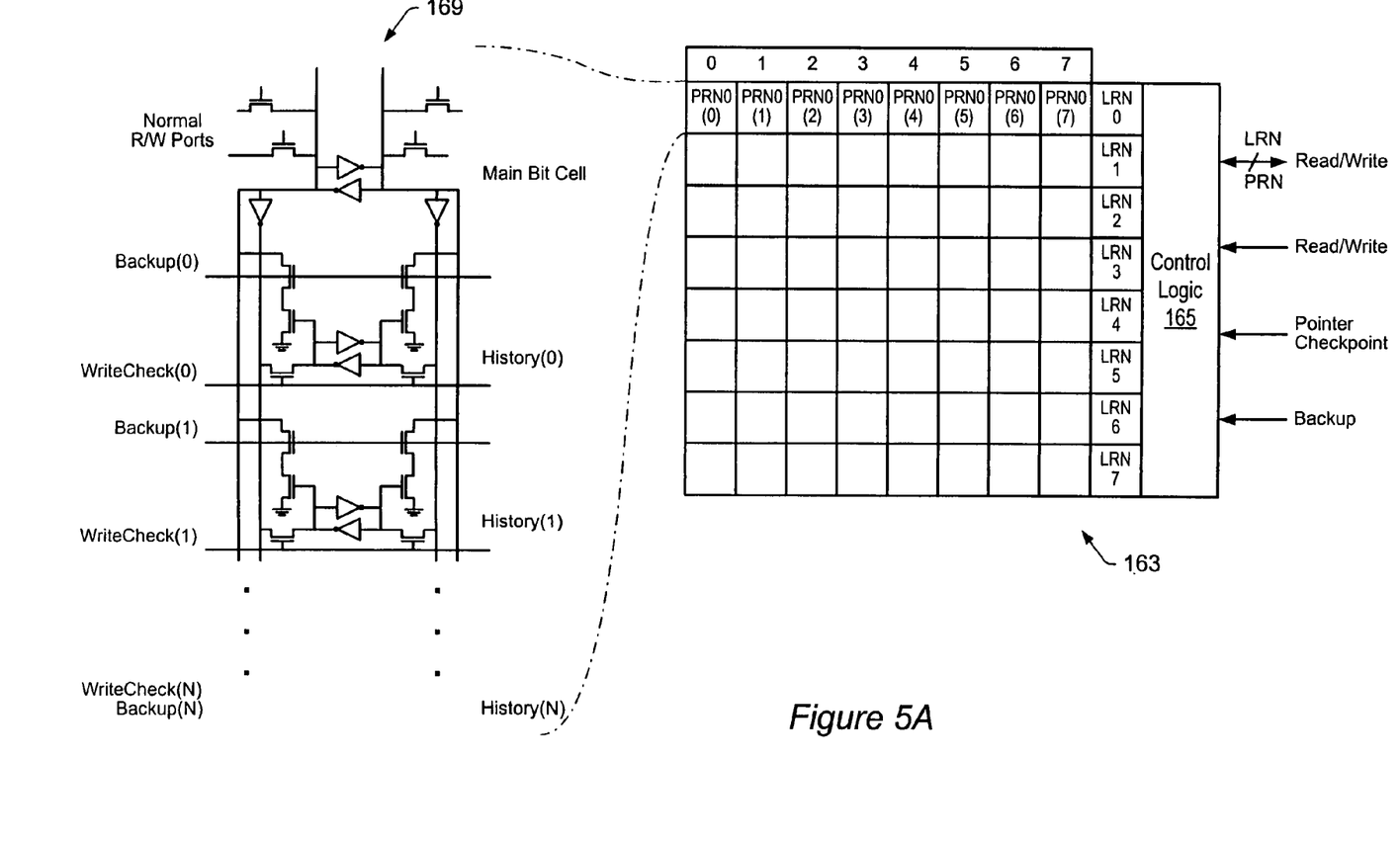
FIG. 5A is a block diagram of one embodiment of a mapper implemented with a random access memory (RAM)

Moving now to FIG. 5A, a block diagram of one embodiment of a mapper implemented with a random access memory (RAM) is shown. In the embodiment shown, mapper 163 is a RAM-based mapper. Mapper 163 may include a plurality of addressable units, each of which is addressable by an LRN ($LRN_0$–$LRN_7$ in this example). Each addressable unit may store PRNs that correspond to the LRN of the addressable unit for a current checkpoint as well as for a number of previous checkpoints. In the example shown, there are 8 addressable units, each of which corresponds to a logical register. Embodiments having a greater or lesser number of registers may correspondingly have a greater or lesser number of addressable units.

Each addressable unit may include a plurality of cell circuits 169, wherein each of the cell circuits corresponds to one bit of a PRN. In this embodiment, PRNs are 8 bits in length, although embodiments using a greater or lesser number of bits for each PRN are possible and contemplated. Each cell circuit 169 may include a main bit cell and a plurality of history cells. The plurality of main bit cells for each addressable unit may comprise a first storage location. The plurality of history cells for each addressable unit may comprise additional storage locations. Each of the additional storage locations may correspond to a checkpoint. In this particular embodiment, the first storage location associated with the main bit cells may be used to store a current checkpoint. Similarly, a previous checkpoint may be associated with a storage location comprising the history cells labeled History (0). Additional checkpoints may be associated with the cells labeled History (1) through History (N), wherein N is the total number of storage locations in each addressable unit. A PRN stored in a storage location indicates that it is assigned to the LRN of that addressable unit for the checkpoint corresponding to the storage location.

Thus, the combination of cell circuits for each addressable unit may allow it to store a PRN for a current checkpoint as well as PRNs for several previous checkpoints. For each addressable unit (and thus each LRN), the PRN associated with the current checkpoint may be stored in the first storage location that comprises the main bit cells. PRNs corresponding to previous checkpoints for a given LRN may be stored in additional storage locations that comprise history cells for each bit position The contents stored in any one of the storage locations of an addressable unit may be copied to any one of the other storage locations. For example, if the first storage location (which corresponds to the current checkpoint in this embodiment) comprising the main bit cells of an addressable unit is to be updated with a new PRN, the PRN stored in the storage location prior to the update may be copied into another storage location. If the PRN is to be copied into the storage location labeled History (0), the Write Check (0) lines may be asserted. When the Write Check (0) lines are asserted for each cell circuit 163 of a given addressable unit, the contents of each of the main bit cells may be allowed to propagate into the history cells. By allowing the contents of each of the main bit cells to be propagated into the history cells for which the Write Check lines are asserted, the PRN may be written into a new storage location. Following the writing of the PRN from the first storage location into one of the history storage locations, a PRN may be written into the main bit cell through the read/write ports by activating the appropriate transistors.

If a backup situation occurs, a PRN stored in one of the history storage locations may be written back into the first storage location. For example, if a backup to the checkpoint corresponding to the History (0) storage location may be effected by asserting the Backup (0) lines for each of the cell circuits of that storage location. When the Backup (0) lines are asserted, the contents of each of the History (0) cells may be allowed to propagate into the main bit cells, thus overwriting their contents. In this was, a LRN-to-PRN association from a previous checkpoint may be restored as the current checkpoint.

Reading and writing to the various storage locations may be controlled by control circuit 161. Control circuit 161 may include a read/write port which may receive both PRNs and LRNs. The LRNs received through the read/write port may indicate the addressable unit to which data is to be written or read. The PRNs may be data that may be written when received by the read/write port. When PRNs are read from mapper 160, an LRN may be received through the read/write port, while a PRN may be output from the read/write port responsive to receiving the LRN.

Control circuit 161 may also receive a pointer and a backup signal. The pointer received by control circuit 161 may point to storage locations in each addressable unit, and may cause the appropriate Write Check lines or Backup lines to be asserted, depending on the particular operation (writing to a history location or backing up). In particular, the pointer may provide a checkpoint to control circuit 161 which may indicate which of the storage locations is to be copied into the first storage location (which, in this embodiment, is associated with the current checkpoint) during a backup situation. The backup signal may indicate that a backup situation has occurred. The pointer may also point indicate which of the history storage locations is to be written to next when a new checkpoint is created.

In various embodiments, the history storage locations of mapper 160 may be written to in the manner of a circular buffer. For example, during a given cycle of the pointer around the circular structure, the History (0) storage location may be the first location written to, the History (1) may be the second, and so on. However, embodiments are also possible and contemplated wherein the RAM-based version of mapper 160 does not have a circular buffer structure.

Figure 5B:
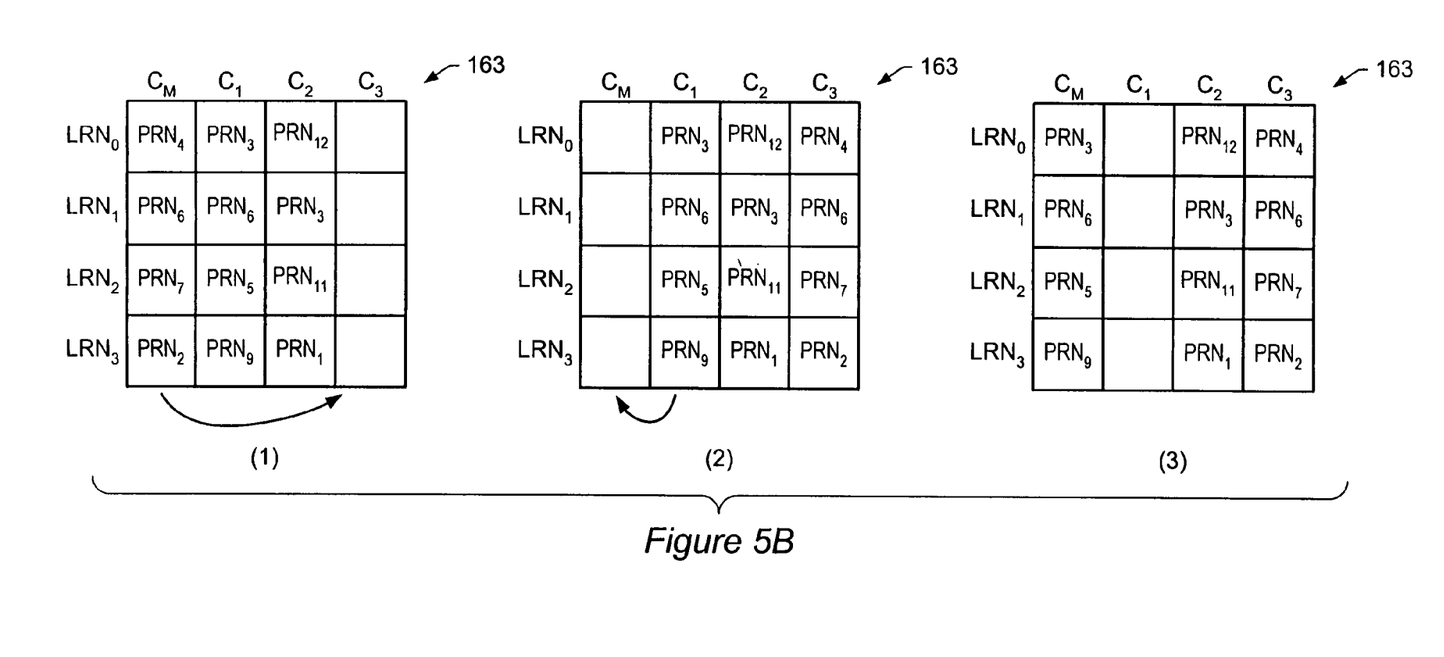
FIG. 5B is an example of a method of operation for one embodiment of a RAM-based mapper.

Turning now to FIG. 5B, an example of method of operation for one embodiment of a RAM-based mapper is shown. It should be noted that the versions of current mapper 160 shown here are for demonstration purposes.

In (1), mapper 160 is shown to be copying the PRNs for LRN-to-PRN mappings associated with the current checkpoint (stored in the first storage location $C_m$) into a history storage location associated with a previous checkpoint. For the purposes of this example, it is assumed that the PRNS stored in storage location $C_1$ were written prior to those in storage location $C_2$. Thus, the PRNs being written into storage location $C_3$ in a manner consistent with the operation of a circular buffer.

In (2), a backup situation has occurred, and the insert pointer (shown in FIGS. 2 and 3) has been backed up to the checkpoint associated with the storage location $C_1$. Thus, the PRNs associated with checkpoint for storage location $C_1$ may be written back into storage location $C_m$, and thus the corresponding mappings may now make up the current map. When the mapping has been re-established for that checkpoint, the execution of instructions that rely on the corresponding LRN-to-PRN associations may be restarted.

In (3), the PRNs associated with the checkpoint to which the backup is occurring are stored in storage location $C_m$, and thus the correct mapping for that checkpoint has been restored.

Computer Systems

Figure 6:
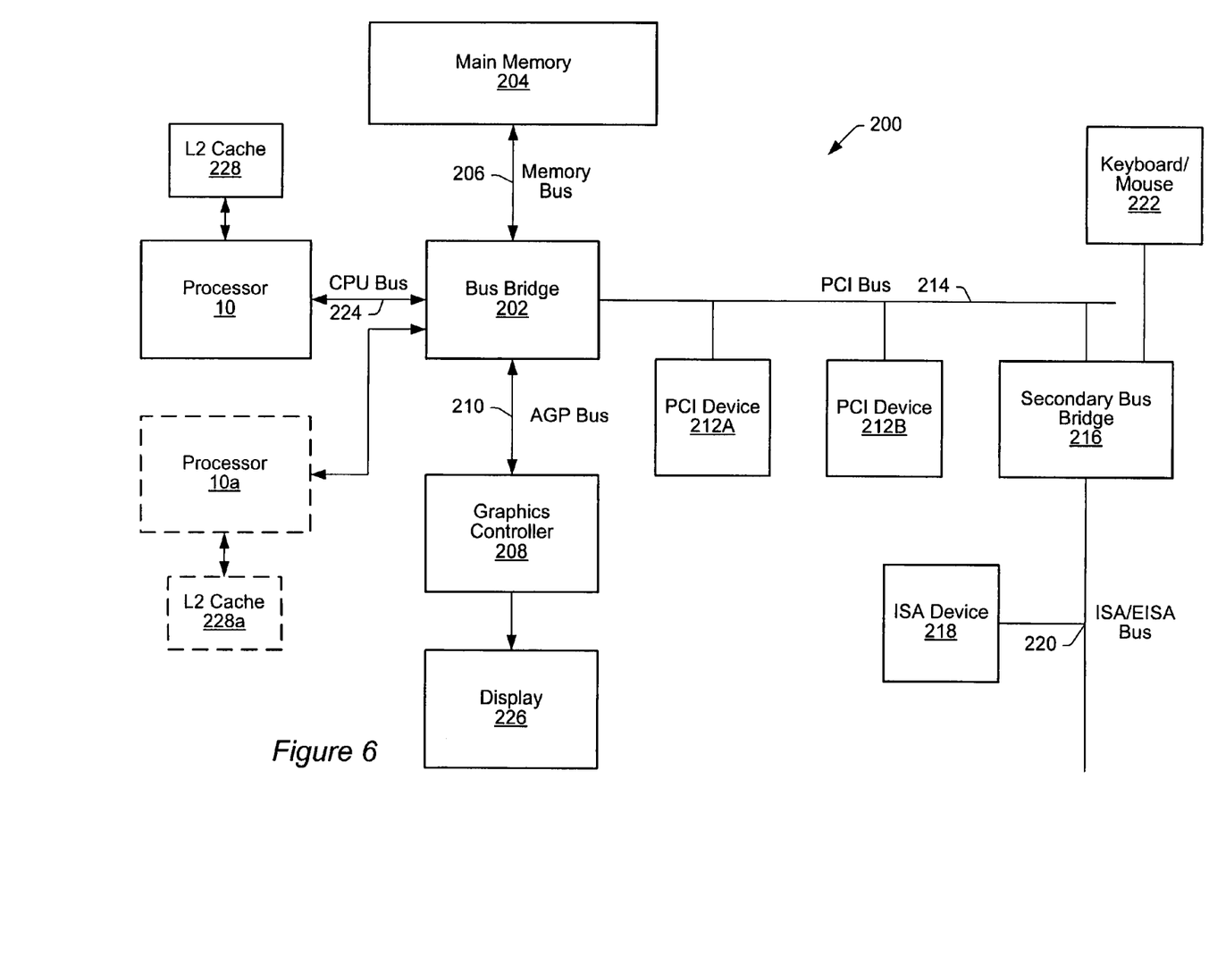
FIG. 6 is a block diagram of a computer system.

Turning now to FIG. 6, a block diagram of one embodiment of a computer system 200 including processor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple. The processor 10 may be the processor 10 shown in FIG. 1, and may include the details shown in the other figures and discussed above.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM), double data rate (DDR) SDRAM, or Rambus DRAM (RDRAM) may be suitable. Main memory 204 may include the system memory 42 shown in FIG. 1.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus or may share CPU bus 224 with processor 10. Furthermore, processor 10a may be coupled to an optional L2 cache 228a similar to L2 cache 228.

Figure 7:
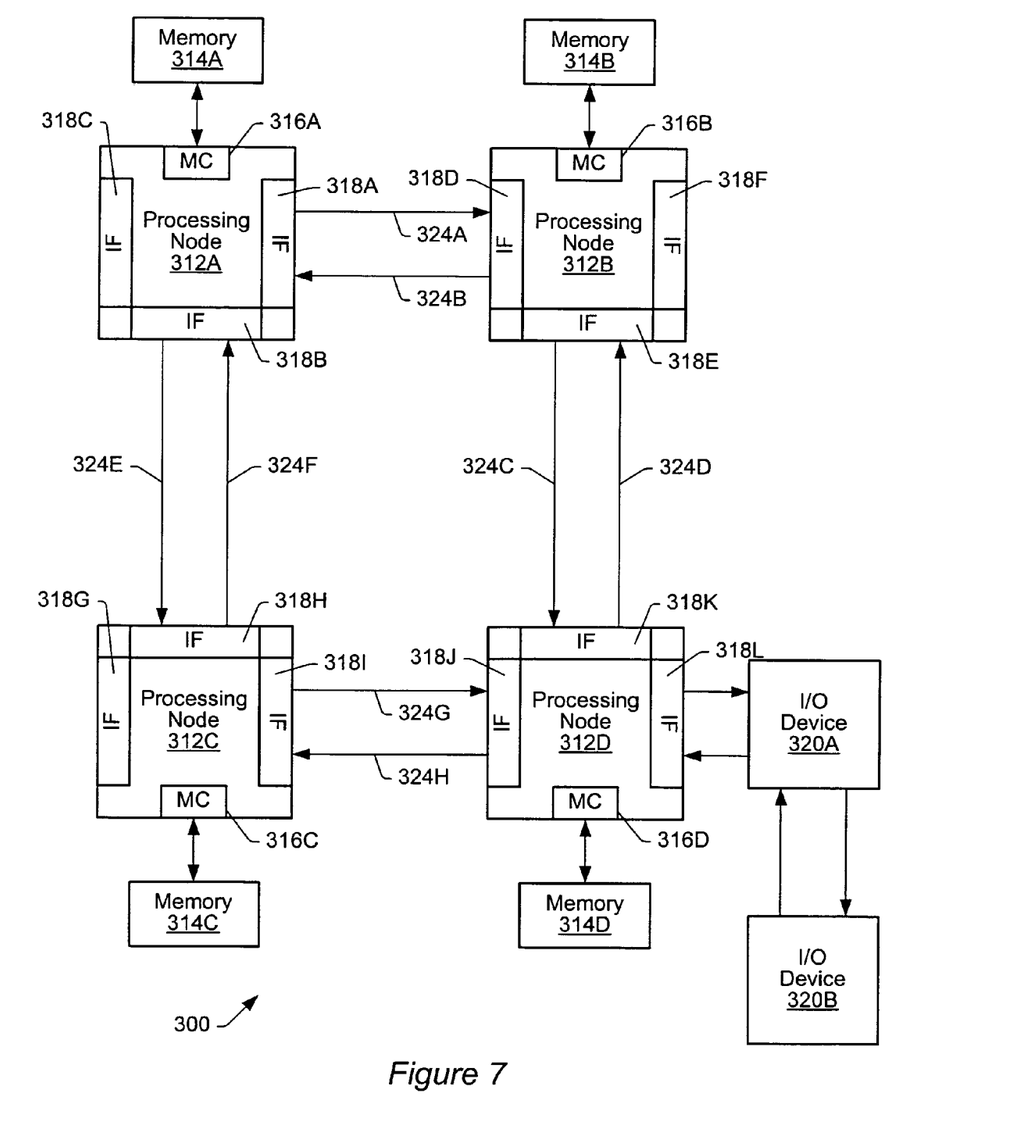
FIG. 7 is a block diagram of an alternate embodiment of a computer system.

Turning now to FIG. 7, another embodiment of a computer system 300 is shown. In the embodiment of FIG. 7, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 7. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 7. Any suitable routing algorithm may be used. Other embodiments of computer system 300 may include more or fewer processing nodes than the embodiment shown in FIG. 7.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 100 as shown in FIG. 1 (e.g. including various details shown in FIGS. 2 and/or 3). External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), DDR SDRAM, static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A mapper circuit for providing associations between logical registers and physical registers, the mapper circuit comprising a memory, the memory comprising:
    a plurality of addressable units, each addressable unit addressed by a different logical register name (LRN) to which that addressable unit is statically assigned, and each addressable unit including a plurality of storage locations, wherein a first storage location of the plurality of storage locations is configured to store a current physical register name (PRN) currently assigned to the LRN, and wherein each other storage location of the plurality of storage locations is configured to store an additional PRN previously assigned to the LRN; and
    a control circuit coupled to the plurality of addressable units, wherein the control circuit is configured, responsive to a new PRN being assigned to a first LRN that addresses a first addressable unit of the plurality of addressable units, to cause the current PRN in the first storage location of the first addressable unit to be copied to a second storage location which is one of the other storage locations of the first addressable unit, wherein the second storage location corresponds to a current checkpoint of a plurality of checkpoints.

2. The mapper circuit as recited in claim 1, wherein the mapper circuit is configured to write the new PRN to the first storage location.

3. The mapper circuit as recited in claim 1, wherein the mapper circuit is configured to, responsive to a backup indication, revert the current PRN in the first storage location of each of the plurality of addressable units to the PRN from one of the other storage locations, wherein the one of the other storage locations is indicated by the indication.

4. The mapper circuit as recited in claim 3, wherein the mapper circuit is coupled to receive a plurality of control signals, each corresponding to one of the storage locations, and wherein said reverting is performed by asserting one of the control signals.

5. The mapper circuit as recited in claim 4, wherein the backup indication is an insert pointer from a scheduler.

6. The mapper circuit as recited in claim 1, wherein the mapper circuit is configured make a copy the PRN in the first storage location to another one of the plurality of storage locations responsive to an assignment of new PRN for another LRN.

7. The mapper circuit as recited in claim 1, wherein the mapper circuit is coupled to receive a plurality of control signals, each corresponding to one of the other storage locations, and wherein the mapper circuit is configured to copy a PRN by asserting one of the plurality of control signals.

8. The mapper circuit as recited in claim 7, wherein the one of the plurality of control signals is asserted based on an insert pointer.

9. The mapper circuit as recited in claim 1, wherein the mapper circuit includes a read port for reading a PRN, wherein the address of the PRN is the desired LRN, and wherein the PRN is read from the first storage location of the addressable unit corresponding to the LRN, and wherein the mapper circuit is configured to output the corresponding PRN responsive to a read operation.

10. A mapper circuit for providing associations between logical registers and physical registers, the mapper circuit comprising a memory, the memory comprising:
    a plurality of memory locations, each corresponding to a different physical register name (PRN), and wherein each memory location is configured to store a logical register name (LRN) and a plurality of valid indications, and wherein each of the valid indications corresponds to a checkpoint and is indicative of whether or not the PRN is assigned to the LRN at that checkpoint;
    wherein a portion of the memory location storing the LRN is implemented as a content addressable memory (CAM) for comparison with an input LRN to the mapper circuit, and wherein a first PRN corresponding to a first memory location of the plurality of memory locations is output as a mapping of the input LRN if the LRN in the first memory location matches the input LRN and a first valid indication of the plurality of valid indications that corresponds a current checkpoint indicates that the first PRN is assigned to that LRN at the current checkpoint.

11. The mapper circuit as recited in claim 10, first valid indication is stored in a fixed location.

12. The mapper circuit as recited in claim 10, wherein a location of the first valid indication is indicated by a pointer.

13. The mapper circuit as recited in claim 10, wherein the mapper circuit includes a write port, wherein when a new PRN is assigned to an LRN, the PRN assigned to the LRN is the address on the write port where data is to be written, and wherein the LRN is the data that is written.

14. The mapper circuit as recited in claim 13, wherein a valid bit corresponding to the LRN is set responsive to the LRN being assigned to a new PRN at a new checkpoint.

15. The mapper circuit as recited in claim 13, wherein, if an LRN is not assigned to the first PRN for the current checkpoint but was assigned to the first PRN for a previous checkpoint, the valid bit is reset.

16. The mapper circuit as recited in claim 15, wherein, if an LRN is assigned to the first PRN for the current checkpoint and was assigned to the first LRN for the previous checkpoint, wherein the previous checkpoint is associated with a last speculative state existing before a speculative state corresponding to the current checkpoint, the valid bit from the previous checkpoint is copied to the current checkpoint.

17. The mapper circuit as recited in claim 16, wherein, if an LRN is not assigned to the first PRN for the current checkpoint but was assigned to the first PRN for the previous checkpoint, the valid bit is reset.

18. The mapper circuit as recited in claim 1, wherein the control circuit is further configured to cause the current PRN in each of the other ones of the addressable units to be copied to one of the other storage locations that corresponds to the current checkpoint.

19. The mapper circuit as recited in claim 1, wherein the memory circuit is arranged into a plurality of rows and a plurality of columns, wherein each row corresponds to an LRN and wherein each column corresponds to one of the plurality of checkpoints, and wherein a PRN is stored in each of the storage locations, thereby associating a PRN to an LRN for a given one of the plurality of checkpoints.

* * * * *